US010866840B2

(12) United States Patent
Garg et al.

(10) Patent No.: US 10,866,840 B2
(45) Date of Patent: Dec. 15, 2020

(54) DEPENDENT SYSTEM OPTIMIZATION FOR SERVERLESS FRAMEWORKS

(71) Applicant: VMWARE, INC., Palo Alto, CA (US)

(72) Inventors: Rajat Garg, Bangalore (IN); Vishal Gupta, Bangalore (IN); Mageshwaran Rajendran, Bangalore (IN); Sivaraj M, Bangalore (IN); Amit Kumar, Bangalore (IN)

(73) Assignee: VMWARE, INC., Palo Alto, CA (US)

(*) Notice: Subject to any disclaimer, the term of this patent is extended or adjusted under 35 U.S.C. 154(b) by 0 days.

(21) Appl. No.: 16/392,652

(22) Filed: Apr. 24, 2019

(65) Prior Publication Data

US 2020/0241930 A1 Jul. 30, 2020

(30) Foreign Application Priority Data

Jan. 24, 2019 (IN) .............................. 201941002960

(51) Int. Cl.
*G06F 9/50* (2006.01)
*G06F 9/455* (2018.01)
*G06F 9/54* (2006.01)

(52) U.S. Cl.
CPC ........ *G06F 9/5072* (2013.01); *G06F 9/45558* (2013.01); *G06F 9/505* (2013.01); *G06F 9/541* (2013.01); *G06F 2009/4557* (2013.01)

(58) Field of Classification Search
CPC .... G06F 9/45558; G06F 9/505; G06F 9/5072; G06F 9/541; G06F 2009/4557
See application file for complete search history.

(56) References Cited

U.S. PATENT DOCUMENTS

| 7,908,605 | B1* | 3/2011 | Graupner | ............ G06F 9/5011 709/226 |
| 2010/0180023 | A1* | 7/2010 | Kraus | .................... H04L 43/08 709/224 |
| 2013/0282892 | A1* | 10/2013 | Levi | ....................... H04L 43/50 709/224 |
| 2018/0129827 | A1* | 5/2018 | Picazo | ................. G06F 40/166 |

* cited by examiner

*Primary Examiner* — Gil H. Lee
(74) *Attorney, Agent, or Firm* — Thomas Horsstemeyer, LLP

(57) ABSTRACT

Various aspects are disclosed for optimization of dependent systems for serverless frameworks. In some examples, a load test executes instances of a function on a dependent system to generate datapoints. The datapoints are organized, using a clustering algorithm, into an acceptable group and at least one unacceptable group. A maximum number of concurrent instances of the function is determined based on a number of instances specified by at least one datapoint selected from the acceptable group. A live workload is performed on the dependent system. The live workload includes instances of the function that are assigned to the dependent system according to the maximum number of concurrent instances.

14 Claims, 6 Drawing Sheets

DEPENDENT SYSTEM OPTIMIZATION FOR SERVERLESS FRAMEWORKS

RELATED APPLICATIONS

Benefit is claimed under 35 U.S.C. 119(a)-(d) to Foreign Application Serial No. 201941002960 filed in India entitled "DEPENDENT SYSTEM OPTIMIZATION FOR SERVERLESS FRAMEWORK", on Jan. 24, 2019, by VMWARE, INC., which is herein incorporated in its entirety by reference for all purposes.

BACKGROUND

Enterprises can develop functions that perform a task or service for enterprise users or enterprise customers. The enterprise can provide access to these functions through applications hosted on data centers. Data centers include various physical and virtual components that can host applications and web services, cloud computing environments, virtualization environments, as well as other computing systems. For instance, computer virtualization relates to the creation of a virtualized version of a physical device, such as a server, a storage device, a central processing unit (CPU), a graphics processing unit (GPU), or other computing resources. However, operating or managing a data center can involve maintaining hundreds to thousands of virtual machines as well as hardware of host machines, which include CPUs, GPUs, and other physical hardware. As a result, enterprises can seek cloud computing options that do not require time consuming data center management.

While access to enterprise functions can be provided through cloud services, the functions nevertheless utilize backend hardware once invoked, for example, to provide storage, compute, or graphics. Existing technologies can make inefficient use of hardware resources, for example, by overloading or underloading the hardware resources as enterprise functions are invoked.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to optimization of dependent systems for serverless frameworks. Enterprises can utilize cloud computing options that do not require time consuming data center management. Serverless frameworks can provide a function as a service (FaaS). This arrangement can allow individual ephemeral functions to be invoked, rather than hosting persistent applications, to provide this functionality. These functions can execute in stateless containers and can be invoked multiple times. Hardware resources that support instances of function can be fully managed by a management service separate from the enterprise. However, existing technologies can make inefficient use of hardware resources, for example, by overloading or underloading the hardware resources as instances of the functions are invoked. The present disclosure provides a solution through a management service that optimizes dependent systems for serverless frameworks.

Figure 1:
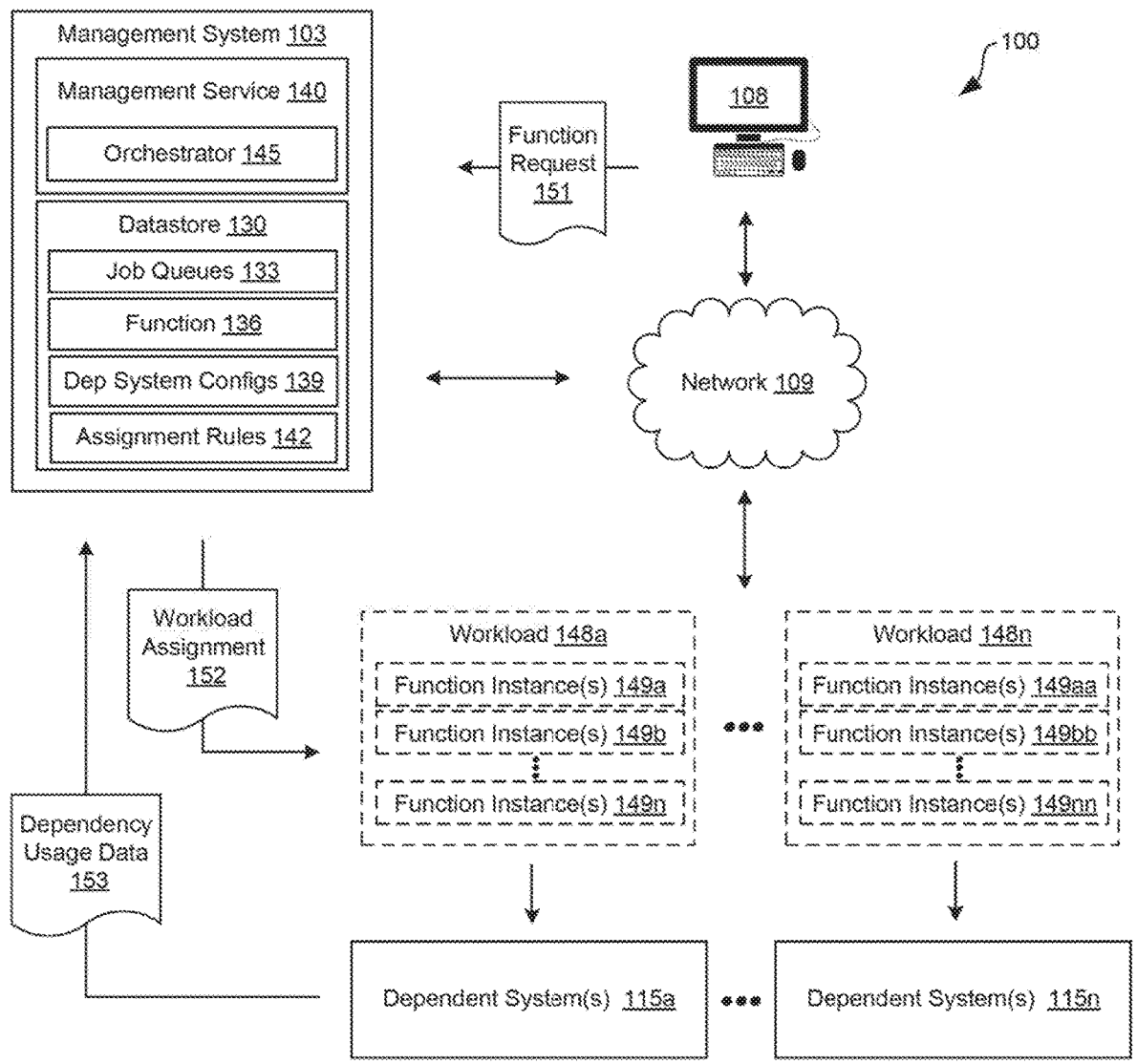
FIG. 1 is a drawing of an example of a networked computing environment that includes a management system, a client device, and dependent systems for a serverless framework.

Turning now to FIG. 1, an example of a networked environment 100 is shown. The networked environment 100 can include a management system 103, client device(s) 108, and various dependent systems 115a . . . 115n (collectively "dependent systems 115") in communication with one other over a network 109. The network 109 can include, for example, the Internet, intranets, extranets, wide area networks (WANs), local area networks (LANs), wired networks, wireless networks, other suitable networks, or any combination of two or more such networks.

The networks can include satellite networks, cable networks, Ethernet networks, telephony networks, and other types of networks. In some examples, the networked environment 100 can serve up virtual desktops to end users and, thus, can also be described as a virtual desktop infrastructure (VDI) environment. In other examples, the networked environment 100 can provide a public cloud computing environment, a private cloud computing environment, or a hybrid cloud computing environment. As such, the networked environment 100 can be referred to as a cloud computing environment in some examples.

The management system 103 can include a server computer or any other system providing computing capability. The management system 103 can provide access to functions for each of a number of different enterprises. While referred to in the singular, the management system 103 can include a plurality of computing devices that are arranged in one or more server banks, computer banks, or other arrangements. The management system 103 can include a grid computing resource or any other distributed computing arrangement. The management system 103 can also include or be operated as one or more virtualized computer instances. For purposes of convenience, the management system 103 is referred to herein in the singular. Even though the management system 103 is referred to in the singular, it is understood that a plurality of management systems 103 can be employed in the various arrangements as described above. The components executed on the management system 103 can include a management service 140 as well as other applications, services, processes, systems, engines, or functionality not discussed in detail herein. The management service 140 can be stored in the datastore 130 of the management system 103.

In various embodiments, the management system 103 can include a plurality of devices installed in racks which can make up a server bank, aggregate computing system, or a computer bank in a data center or other like facility. In some examples, the management system 103 can include high-availability computing systems. A high-availability computing system is a group of computing devices that act as a single system to provide a continuous and constant uptime. The devices in the management system 103 can include any number of physical machines, virtual machines, virtual appliances, and software, such as operating systems, drivers, hypervisors, scripts, and applications.

In some examples, a management system 103 can include a computing environment that includes hundreds or even thousands of physical machines, as well as virtual machines and other software implemented in devices stored in server racks, distributed geographically, and connected to one another through the network 109. It is understood that any virtual machine or other virtual appliance can be implemented using at least one physical device, such as a server or other computing device.

The management system 103 can utilize various dependent systems 115a . . . 115n to provide physical resources that enable the operation of workloads 148a . . . 148n (collectively "workloads 148"). For example, the workloads 148a and 148n can include the function instances 149a . . . 149n and 149aa . . . 149nn (collectively "function instances 149"), respectively. While referred to as function instances 149, each function instance 149 can be executed in a container such as a compute or init container as directed in conjunction with the orchestrator 145. The dependent systems 115 can include physical computing hardware including, servers, datastores, memories, and other storage devices, switches, routers, and other network devices, graphics cards having one or more GPUs, central processing units (CPUs), power supplies, and other devices. In various examples, the servers can include requisite physical hardware and software to create and manage virtualization infrastructure or a cloud computing environment. In some examples, the computing resources can also include virtual computing resources, such as virtual machines or other software.

The management service 140 can monitor dependency usage data 153 for the dependent systems 115 both during live workload operation as well as during load test operation. In some cases, the dependent systems 115 can include instructions to transmit this usage data 153 to the management service 140. The dependency usage data 153 can include actual usage values and metrics for compute, memory, graphics, temporary storage, persistent storage, and other resources for an instance of a function 136. Errors and other metrics can also be provided in the dependency usage data 153.

The datastore 130 can include memory of the management system 103, mass storage resources of the management system 103, or any other storage resources on which data can be stored by the management system 103. The datastore 130 can include memory and datastores for the dependent systems 115. For instance, the datastore 130 can include one or more relational databases, such as structure query language (SQL) databases, non-SQL databases, or other relational or non-relational databases. The data stored in the datastore 130, for example, can be associated with the operation of the various services or functional entities described below. The datastore 130 can include a database or other memory that includes, for example, a job queue 133, functions 136, dependent system configurations 139, and assignment rules 142, as well as other data not discussed herein.

The job queue(s) 133 can include the workloads 148, as well as the related function instances 149. A job queue 133 can store a list of the workloads 148 according to an order of priority. In some examples, once a memory limit for the job queue 133 is exceeded, the additional workloads 148 and related function instances 149 can be stored in a disk backed queue of the datastore 130.

The functions 136 can include function definitions for FaaS functions that can be invoked and instantiated on demand for an enterprise. For example, a function 136 can include code that receives an input, and performs an action or transforms the input into a desired output. An instance of a function 136 can be created in a compute or init container and can be ephemeral in that the management service 140 can create the instance of the function 136 and destroy it and its container once completed. The instance of the function 136 can be stateless, in that the instance itself does not remain in a persistent storage. However, while the instance of the function 136 is stateless, it can store and access persistent action logs, results, outputs, and other data in a persistent datastore that is separate from the instance of the function 136. In this way, both naturally stateless functions and state oriented functions can be considered stateless. The dependent systems 115 can include persistent datastores 130 that are utilized for instances created from the function 136. The dependent systems 115 can also include the physical hardware that provides compute, memory, graphics, temporary storage, persistent storage, and other resources for an instance of a function 136.

The function 136 can include a name of the function or a function identifier. The function 136 can also include executable function code. The function code can be code that complies with a FaaS API, such as REST API, OpenFaaS API or another API. The function 136 can also include a trigger or event criteria which if met will tell the platform to deploy and execute the function 136. An event can include receiving an external API call at an endpoint of the management service 140 defined in the function 136, for example, from a client device 108. For example, a function request 151 can be transmitted by a client device 108 to the management service 140. The function request 151 can include the function identifier, and an identifier or address of the endpoint for the particular function 136. The function request 151 can request data that is associated with or provided by the function 136, and the management service 140 can identify the function based on the requested data. The management service 140 can include an API gateway, for example, a REST API gateway, OpenFaaS API gateway, or another API gateway that is configured to receive API calls. An event can also include a notification event triggered as a result of an operation, for example, creation of a virtual machine, execution of another function 136, and other enterprise operations.

Each function 136 can be associated with a particular enterprise. The management service 140 can include, for each function 136, a service level agreement (SLA) that indicates a level of service at which the function 136 should be provided according to a metric. For example, an enterprise can contract for a function 136 to be provided on demand, and the function SLA can indicate a predetermined percentage of uptime for the function 136 when requested, or a specified maximum wait time to create an instance of the function 136, or a time period to complete the function 136. The management service 140 can utilize the function SLA to determine whether an additional function instance 149 of the function 136 should be created in order to meet or exceed the function SLA. A function SLA can also include metrics that are associated with dependent systems that it utilizes. For example, data capacity and threshold conditions for memory utilization as a percentage of the data capacity, a compute capacity and threshold conditions as a value or percentage of the compute capacity, a graphics compute capacity and threshold conditions as a value or percentage of the graphics compute capacity, a network capacity and threshold conditions as a value or percentage of the network capacity. A threshold condition can indicate whether a value for a particular function 136 is greater than, less than, or equal to (or a combination thereof) a threshold level. The management service 140 can utilize function SLAs to determine whether to spawn or create an additional function instance 149. If any one of the function SLAs are triggered, for example, for any one of the dependent system metrics, then an additional function instance 149 can be spawned or created.

The dependent system configurations 139 can include a hardware configuration and a software configuration for various dependent systems 115. A hardware configuration can include a list of system parameters along with acceptable thresholds for the dependent system 115. For example, a dependent system 115 can include one or more of a datastore, a computing device, a graphics device, a network device, an output device, an input device, or other devices. For a datastore, the hardware configuration can include a data capacity and an acceptable threshold conditions for memory utilization, for example, in inputs/outputs (I/O) or a percentage of the data capacity. For a computing device or CPU, the hardware configuration can include a compute capacity and acceptable threshold conditions as a value or percentage of the compute capacity. For a graphics device or GPU, the hardware configuration can include a graphics compute capacity and acceptable threshold conditions as a value or percentage of the graphics compute capacity. A network device can include a network capacity and acceptable threshold conditions as a value or percentage of the network capacity. A threshold condition can indicate whether acceptable operation is greater than, less than, or equal to (or a combination thereof) a threshold level. A software configuration can include programs, operating systems, and other instructions executed by a dependent system 115, for example, to provide compute, memory, graphics, and network resources for a function 136. The acceptable thresholds can also be referred to as dependent system SLAs, and the acceptable thresholds can be determined or defined according to an SLA with an enterprise. The management service 140 can analyze acceptable thresholds of dependent system SLAs to determine an optimal or maximum number of function instances 149 to assign to a particular dependent system 115. Accordingly, the management service 140 can consider two levels of SLAs including function SLAs and dependent system SLAs.

The dependent system configurations 139 can also include a type or category for each of the dependent systems 115 or components of the dependent systems 115. For example, a category or type can include a model number or hardware identifier for a dependent system 115 or a component. Once a dependent system configuration 139 is established for a particular dependent system 115 or component, additional dependent systems 115 of the same type can be associated with the same type or category.

The assignment rules 142 can indicate a maximum number of instances of a particular function 136 that can be executed concurrently on a particular dependent system 115. As discussed in further detail below, the management service 140 can determine this maximum number of instances based on a load test for a particular function 136 and dependent system 115 combination. Once the maximum number of instances is determined (for example, to optimize performance according to the acceptable thresholds), the management service 140 can associate the maximum number of instances with the type of the dependent system 115, so that load tests need not be performed for that function 136 and that type of dependent system 115. The management service 140 can assign one or more instances of the function 136 to a particular dependent system 115, for example, by transmitting a workload assignment 152.

The assignment rules 142 can also track the SLA for each function 136. The function SLA can be utilized to determine whether to create a new function instance 149. The assignment rules 142 can include rules that determine whether an additional dependent system 115 should be allocated to an enterprise in order to maintain the SLA for the function 136. For example, a history or log stored by the managements service 140 can indicate a total number of instances of a function 136 that are utilized by the enterprise over a period of time, a spawn rate for the function 136, or a request rate for the function 136.

The components executed on the management system 103 can include, for example, a management service 140 as well as other applications, services, processes, systems, engines, or functionality not discussed in detail herein. The management service 140 can be executed to oversee the operation of the networked environment 100 through management of the dependent systems 115 as well as the physical and virtual computing resources 113 that make up the dependent systems 115. In some examples, an enterprise, organization, or other entity can operate the management service 140 to oversee or manage the operation of devices in racks 112, such as servers, switches, datastores, CPUs, GPUs, power supplies, cooling systems, and other components.

Additionally, in some examples, the management service 140 can include a container orchestrator 145. Traditionally, the container orchestrator 145 can oversee the creation and destruction of live and test workloads 148 such as the function instances 149 that utilize dependent systems 115. Additionally, in some examples, the container orchestrator 145 can organize, prioritize, distribute, and balance function instances that are assigned to utilize the dependent systems 115. The container orchestrator 145 can include Kubernetes (k8s), Swarm, Mesos, or another orchestrator.

The various physical and virtual components of the dependent systems 115 can process workloads 148. A workload 148 can refer to the collective function instances 149 that are assigned to a particular dependent system 115. The workloads 148 can be associated with virtual machines, public cloud services, private cloud services, hybrid cloud services, or other software executing on the dependent systems 115. For instance, the workloads 148 can include function instances 149 to be processed to provide function-as-a-service (FaaS) on behalf of an enterprise through public cloud services, private cloud services, hybrid cloud services, or a combination thereof. In another example, the workloads 148 can include function instances 149 to be processed to provide employees of an enterprise with functions 136 through remote desktop sessions or other virtualized computing sessions. The workloads 148 can include tasks to be processed to provide serverless architecture. Serverless architecture can refer to the management system 103 providing FaaS for a function 136. In some cases, the serverless architecture can manage multiple functions 136 that collectively provide a larger service for the enterprise. The management service 140 can organize and execute the functions 136 in containers, and further provide persistent data for the functions 136 for example on dependent system 115, without requiring an enterprise developer or administrator to configure and maintain a proprietary server.

Figure 2:
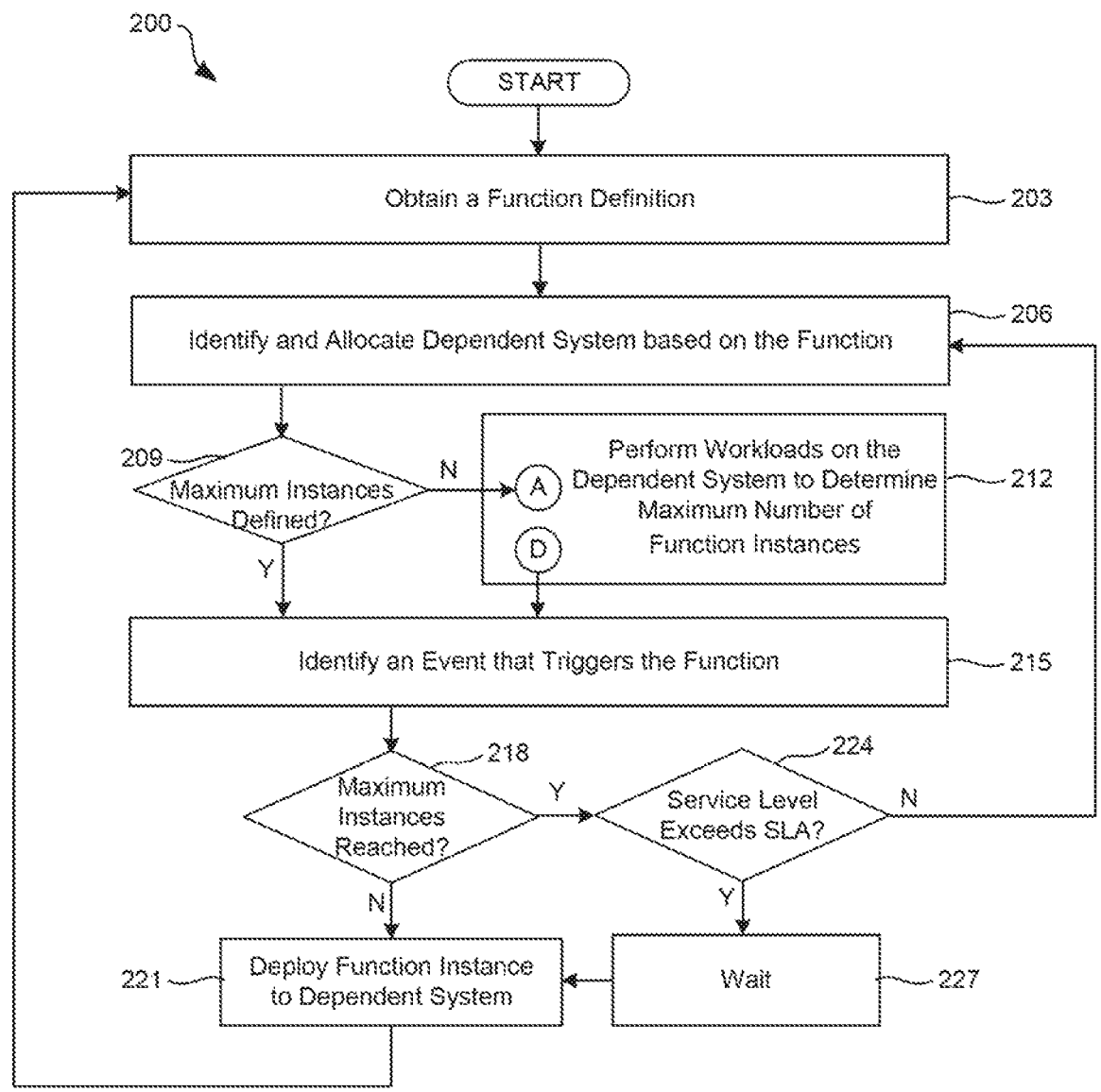
FIGS. 2-4 are flowcharts illustrating examples of functionalities implemented by components of the networked computing environment of FIG. 1.

In FIG. 2, shown is a flowchart 200 that provides one example of the operation of a portion of the networked environment 100. The flowchart 200 can be viewed as depicting an example of elements of a method implemented by the management system 103 according to one or more examples. The ordering, separation, or segmentation of functionality as discussed herein is presented for illustrative purposes only.

In step 203, the management service 140 can obtain a definition of a function 136. For example, the management service 140 can generate a console user interface for administration of the serverless framework and other services provided by the management service 140. A user can log into the console user interface using an account associated with a particular enterprise. The account can be a user account, an enterprise account, or any account with the management service 140. The management service 140 can authenticate the account based on enterprise credentials, user credentials, or other credentials associated with the account. The console user interface can include a user interface element through which a function definition can be entered, uploaded, or otherwise obtained. The management system 103 can associate the function 136 with a particular enterprise based on the credentials for a user account.

In step 206, the management service 140 can identify a dependent system 115 based on the function 136. For example, an administrator or user can enter or identify appropriate hardware for the function 136 through the console user interface. In other cases, the management service 140 can analyze the definition or code of the function 136 and identify appropriate hardware for the function 136. Compute, memory, graphics, network, and other resources can be identified. The management service 140 can identify a dependent system 115 or a type of dependent system 115 that can provide appropriate hardware resources for the function 136.

The management service 140 can allocate a dependent system 115 to provide appropriate hardware resources for a serverless framework, where the enterprise does not administrate or directly manage the hardware resource. The management service 140 can provide infrastructure and services for a number of different enterprises. To maintain secure separation of information, a hardware resource, or a virtual resource associated with the hardware resource, can be allocated to a particular enterprise. The management service 140 can temporarily allocate a dependent system 115 or durably allocate a dependent system 115.

The management service 140 can provide temporary allocation in situations where the dependent system 115 does not provide persistence. Temporary allocation of a dependent system 115 can include allocating a dependent system 115 to an enterprise for a lifecycle of a single or particular instance of a function 136. For example, the management service 140 can allocate a dependent system 115 to an enterprise for a compute or graphics-compute function 136. Where the dependent system 115 does not provide persistence, the management service 140 can temporarily allocate the dependent system 115 to an enterprise for the duration of a single function 136. In some cases, while a first function 136 of the enterprise is executed on the dependent system 115, the management service 140 can deploy or assign additional functions 136 of the enterprise to the same dependent system 115. The management service 140 can maintain a temporary allocation of the dependent system 115 until all functions 136 have completed. Once all instances of the function 136 are completed, or no instances of the function 136 are currently assigned to the dependent system 115, then the temporary allocation of the dependent system 115 to the enterprise can end or be destroyed.

The management service 140 can provide durable allocation in situations where the dependent system 115 provides persistence. For example, the management service 140 can maintain a durable allocation of a dependent system 115 even if all instances of the function 136 are completed, or no instances of the function 136 are currently assigned to the dependent system 115. For example, the hardware can include a persistent hardware such as a persistent log or datastore for the function 136. In these cases, the management service 140 can durably allocate a dependent system 115 to the enterprise to provide persistence for instances of the function 136.

In step 209, the management service 140 can determine whether a maximum number of function instances 149 is defined, for example, for the dependent system 115 or a type of the dependent system 115. The management service 140 can refer to the assignment rules 142 to determine whether a maximum number of function instances 149, for a particular function 136, is stored in association with a particular dependent system 115 or a type of the dependent system 115. If the maximum number of function instances 149 is not yet defined for the dependent system 115, the management service 140 can proceed to step 212. However, if the maximum number of function instances 149 is already defined, the management service 140 can proceed to step 215.

The "maximum" number of function instances 149, the term can refer to a specified number of function instances 149 allowed to be assigned to the dependent system 115 by the management service 140. The specified number of function instances 149 can be a number selected or determined based on a given set of acceptable operational thresholds, and the clustering algorithm that is utilized. If a different set of thresholds are defined, or a different clustering algorithm is utilized, the specified or maximum number of function instances 149 can increase, decrease, or remain the same.

In step 212, the management service 140 can perform workloads 148 of a particular function 136 on a dependent system 115 to determine the maximum number of function instances 149. The workloads 148 can include live workloads 148, for example, those that are being actively requested or utilized for an enterprise. In some examples, test workloads 148 can be performed prior to permitting a live workload 148 to be executed on the dependent system 115. This can ensure that there is no loss of service or drop in service level for live workloads 148. Connectors A and D connect to FIG. 3, providing an example of performing a workload 148 to determine the maximum number of function instances 149 for a particular dependent system 115.

In step 215, the management service 140 can identify an event that triggers the function 136. For example, the management service 140 can receive a function request 151, for example, from a client device 108 external to the management service 140. The function request 151 can include an API call that includes the function identifier, and an identifier or address of the endpoint for the particular function 136. In another example, the management service 140 can determine that an operation or action has occurred in the management service 140 that comprises a trigger event for the function 136.

In step 218, the management service 140 can determine whether the maximum number of function instances 149 for the dependent system 115 is reached. The management service 140 can monitor the dependent systems 115 to determine the actual number of concurrent function instances 149 on the dependent system 115. The management service 140 can compare the actual number of concurrent function instances 149 to the maximum or selected number of concurrent function instances that is defined for the particular function 136 and the dependent system 115. If the maximum number is not reached, the management service 140 can proceed to step 221. However, if the maximum number of function instances 149 is reached, then the management service 140 can proceed to step 224.

In step 221, the management service 140 can deploy function instances 149 to the dependent system 115. The deployment can include assigning the function instance 149 to the dependent system 115 and creating the function instance 149, as well as executing the function instance 149. The management service 140 can prioritize the function instance 149, or a workload 148 that includes the function instance 149, within a job queue 133 can includes a prioritized list of the workloads 148 or function instances 149. A function instance 149 can be assigned to multiple dependent systems 115. For example, the function instance 149 can be assigned to execute on a first depended system 115 and can be assigned to utilize a second dependent system 115 as a persistent datastore. Since the function instance 149 itself is ephemeral and stateless, the second dependent system 115 can be separate from the container through which the function instance 149 is executed. The assignment of the function instance 149 to the dependent system 115 can be for the lifecycle of the function instance 149, for example, from a creation of the function instance 149 until a completion of the function instance 149. The function instance 149 can execute to completion and can be destroyed.

In step 224, the management service 140 can determine whether a service level meets a level defined by a Service Level Agreement (SLA). To this end, management service 140 can determine an actual service level metric associated with the function 136. The management service 140 can receive dependency usage data 153, and can calculate the actual service level metric based on this information. The management service 140 can determine whether the actual service level metric exceeds an expected service level metric defined in an SLA for the function 136. If the actual service level provided exceeds the expected service level, for example, by a threshold, then the management service 140 can proceed to step 227. If the actual service level is below the expected service level, or does not exceed the expected service level by the threshold, then the management service can proceed to step 206 and allocate an additional dependent system 115. This can allow an additional function instance 149 to be added so the SLA for the function 136 can be met or exceeded.

In step 227, the management service 140 can wait for the completion of one of the function instances 149. One the function instance 149 is completed, the management service 140 can destroy the function instance 149. In other words, the management service 140 can delete the container of the function instance 149, or delete the function instance 149 from the container. The management service 140 can also unassign, or remove the assignment of, the function instance 149 from the dependent system 115. Once the function instance 149 is unassigned from the dependent system 115, another function instance 149 can be assigned and executed on the dependent system 115. To this end, the management service 140 can proceed to step 221.

Figure 3:
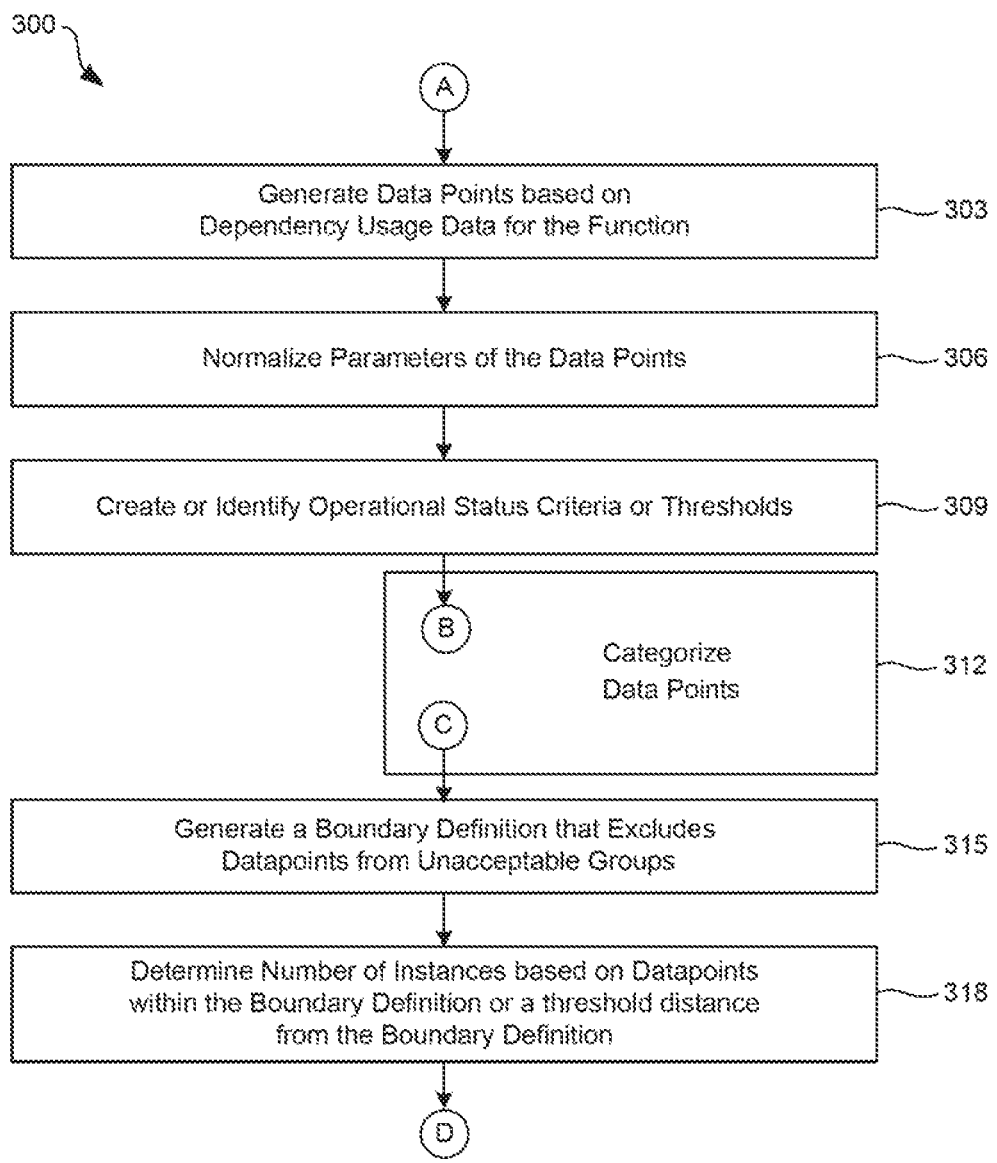

In FIG. 3, shown is a flowchart 300 that provides one example of the operation of a portion of the networked environment 100. The flowchart 300 can be viewed as depicting one example of performing a workload 148 on a dependent system 115 to determine a maximum number of concurrent function instances 149 for the dependent system 115. The ordering, separation, or segmentation of functionality as discussed herein is presented for illustrative purposes only.

In step 303, the management service 140 can generate datapoints based on dependency usage data 153 for the function 136. For example, the management service 140 can perform a load test for a particular function 136 and a particular dependent system 115. This can involve assigning and executing various different test (or live) workloads 148 on the dependent system 115. The test workloads can include different numbers of function instances 149. The management service 140 can record the results as datapoints or tuples with a number of system parameters of the dependent system 115, as well as an indication of the number of function instances that yielded the resulting datapoint. System parameters of the dependent system 115 or related infrastructure can be measured during the load test. The system parameters can include network usage, compute usage, graphics usage, memory usage, and other parameters as discussed. In some cases, the system parameters can also include errors or error codes such as a 503 server busy or network error, or another type of system error. Measuring parameters of the dependent system 115 can include receiving or otherwise obtaining dependency usage data 153. The dependency usage data 153 can include a tuple or another data structure that specifies the various system parameters of the dependent system 115. The dependency usage data 153 can also indicate the number of function instances 149 that are deployed to the dependent system 115 for the measurement. A datapoint or tuple can specify: a number of instances, a sum of metric thresholds for the function instances 149, Data Store CPU Usage for a dependent system 115, Data Store Memory Usage for a dependent system 115, and other items as discussed.

In step 306, the management service 140 can normalize the parameters of the dependency usage data 153. The management service 140 can normalize the parameters, for example, min-max scaling. For example, based on the following equation:

$$X_{scaled} = X - X_{min} / X_{min} - X_{max}. \qquad (1)$$

The management service 140 can also remove outliers from the dependency usage data 153. For example, the management service 140 can, for each parameter, identify a maximum and minimum value from all datapoints collected. Parameters in each datapoint can be ranked, for example from 0% to 100%. Outliers can be removed by eliminating tuples that correspond to a threshold range of percentage values from the upper and/or lower end of the range. The management service 140 can also remove outliers based on a normal distribution and/or standard deviation. Datapoints can be removed if they include a value for a parameter that lies outside a predetermined number of standard deviations for the set of values for that parameter.

In step 309, the management service 140 can create or identify operational status criteria. Take an example where the dependent system 115 is a datastore for persistent storage. The management service 140 can define an acceptable status for the datastore system. As a non-limiting example, an acceptable status can specify datapoints where (1) HTTP request throttling is enabled, but not 503 errors are returned, (2) a server failure rate less than 0.1%, (3) server-side latency is less than 3 seconds for at least 75% of access requests, and (4) average CPU utilization is less than 90%. An unacceptable status can, for example, specify datapoints where (1) no 503 errors are received, (2) server failure rate is over 0.1%, latency is greater or equal to 3 seconds for 75% of access requests, and average CPU utilization is greater than 90%. Another unacceptable criteria can specify datapoints where a 503 error is received.

In step 312, the management service 140 can categorize the datapoints of the dependency usage data 153. The datapoints can be categorized into status groups according to status criteria from step 309. In some examples, a clustering algorithm can be utilized to create or modify the groups. For example, k-means, k-medians, mean-shift, or another clustering algorithm. The status groups can include an acceptable status group associated with acceptable operation of the dependent system 115 and one or more unacceptable status groups associated with unacceptable operation of the dependent system 115. Connectors B and C connect to FIG. 4, providing an example of performing k-means clustering.

In step 315, the management service 140 can generate a boundary definition that excludes unacceptable datapoints, for example, from the unacceptable groups. In order to ensure acceptable performance of the dependent system 115, the boundary condition can generally separate acceptable datapoints from unacceptable datapoints. The boundary condition can be generated to exclude all unacceptable datapoints. In some cases, some of the acceptable datapoints from the acceptable group are also excluded from the boundary condition.

In one example, for each system parameter, the boundary values can be chosen such that all of the datapoints of the unacceptable groups include at least one value that is greater than at least one boundary value. In other words, the range or area bounded from the origin to the boundary does not include any unacceptable datapoints. An example of this can be seen in FIG. 5A. In further examples, the boundary condition can define a range of values such as a two dimensional area, three dimensional volume, or another multiple dimensional range relationship, as see in in FIG. 5B.

In step 318, the management service 140 can determine a selected maximum number of function instances 149. The maximum number of function instances 149 can be determined for instances of the function 136 on the dependent system 115. Where the boundary definition is a range, the management service 140 can identify one or more exemplary or boundary datapoints that are within the boundary definition. Where the boundary definition includes a list or set of boundary values, the boundary datapoints can be within a threshold distance from one or more of the boundary values. For example, the exemplary datapoints can be within a threshold distance from any one of the acceptable parameter values, or within a threshold distance from all of the parameter values. In some cases, the distance can be in a direction from the boundary value towards an origin or towards a zero value.

The boundary or exemplary datapoints can each indicate a number of function instances 149. The selected maximum number of function instances 149 can be a minimum number of function instances 149 from the boundary datapoints. In other cases, the selected maximum number can be an average, mean, or mode number of function instances 149 indicated by the boundary datapoints.

Figure 4:
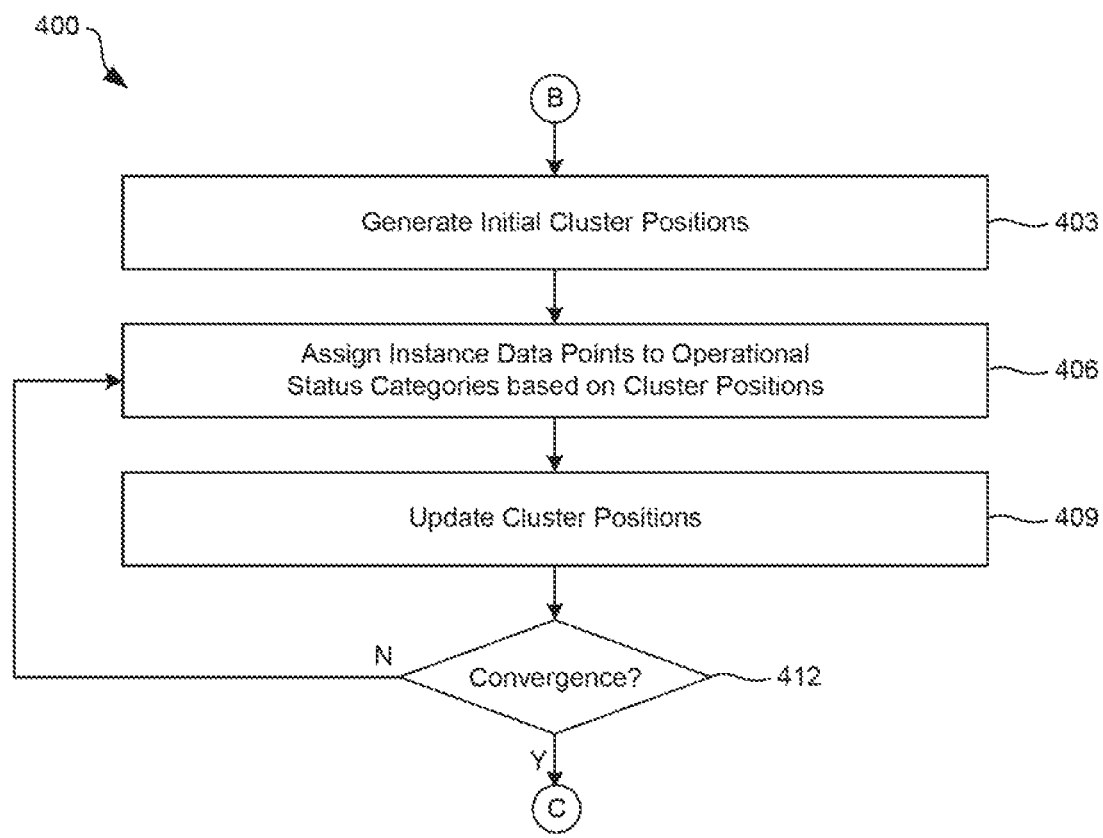

In FIG. 4, shown is a flowchart 400 that provides one example of the operation of a portion of the networked environment 100. The flowchart 400 can be viewed as depicting one example of categorization of datapoints according to a clustering algorithm such as k-means clustering. The ordering, separation, or segmentation of functionality as discussed herein is presented for illustrative purposes only.

In step 403, the management service 140 can generate initial cluster positions for each status group. It should be noted that the clustering algorithm can change the specific datapoints that belong to each status group. The datapoints can be initially categorized according to status groups that correspond to the status criteria, for example, as discussed above. The management service 140 can plot or geometrically analyze datapoints in "n" dimensions corresponding to a number of system parameters considered. To this end, each datapoint or tuple can be considered as an n-dimensional vector. In one example, the initial cluster positions can be assigned as a location or vector of a single datapoint selected from each status group. In another example, the management service 140 can calculate a respective mean, median, or other metric for the datapoints belonging to each group. The locations defined by the respective means can be the initial cluster positions.

In step 406, the management service 140 can assign, or reassign, each datapoint to a particular status group based on the current cluster position for the particular status group. The management service 140 can determine a geometric distance from the center of each status group. For a datapoint, the management service can calculate a geometric distance to each cluster position. The management service 140 can reassign the datapoint to the status group corresponding to the nearest cluster position for the particular status group. In some cases the datapoint does not need to be reassigned.

In step 409, the management service 140 can update cluster positions. For example, the management service 140 can calculate, or recalculate, the geometric centers for each cluster based on the datapoints belonging to each group.

In step 412, the management service 140 can determine whether the groups have converged. For example, the management service 140 can consider the groups as converged once a mean squared error is minimum. In another example, once none or less than a threshold percentage of the datapoints are reassigned, the groups have converged. If the clusters have not converged, then the management service 140 can proceed to step 406 and reassign the tuples based on proximity to updated cluster centers. If the clusters have converged, then the management service 140 can proceed, for example, through connector "C" to step 315 of FIG. 3.

Figure 5A:
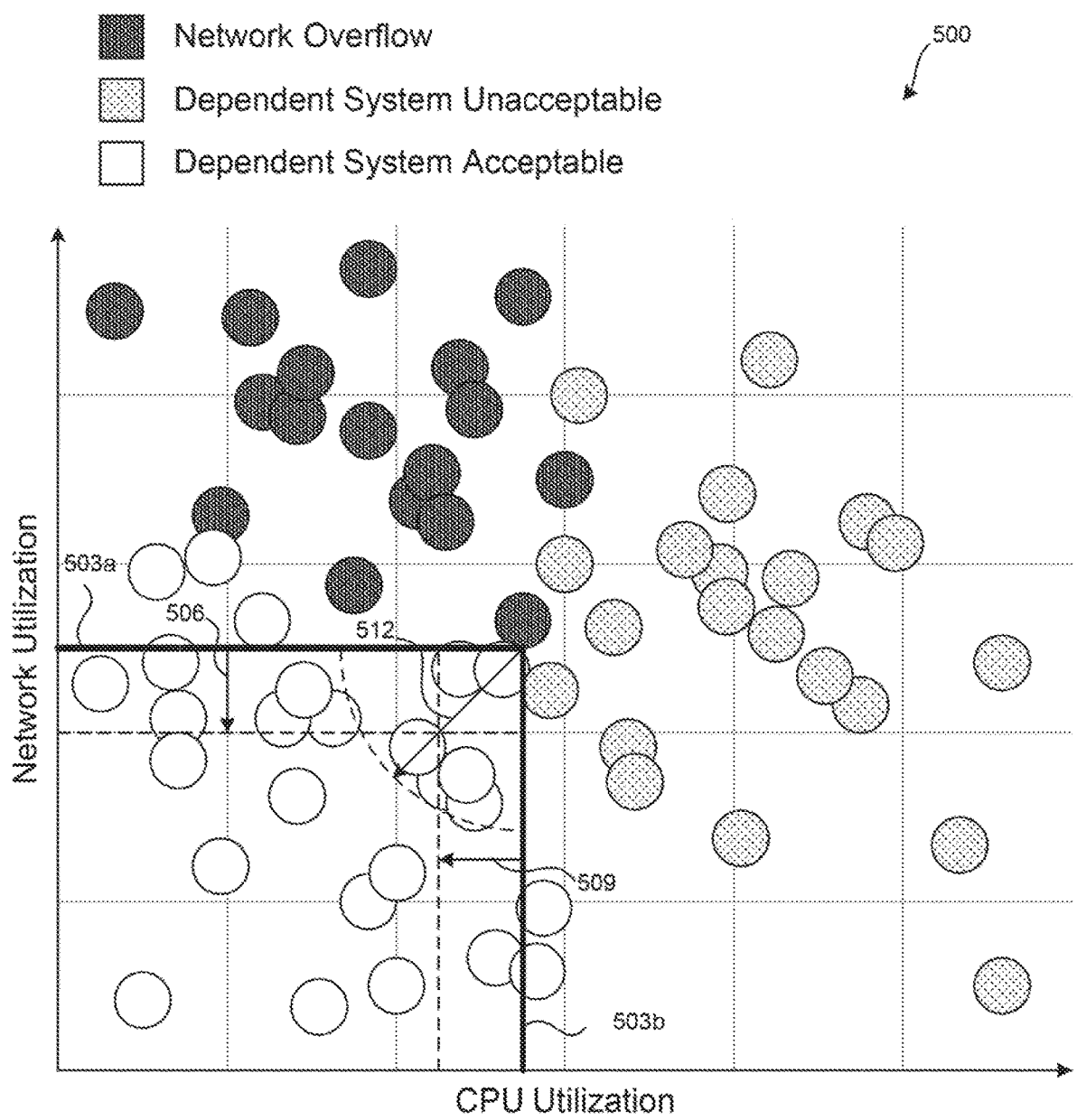
FIGS. 5A and 5B are graphs illustrating examples of plotted datapoints for parameters of a dependent system.

In FIG. 5A, shown is a graph 500 illustrating an example of plotted datapoints for parameters of a dependent system 115. While the graph 500 is illustrative of concepts utilized by the management service 140, a console user interface generated by the management service 140 can include graphs of datapoints for parameters of a dependent system 115, their groupings, and boundary definitions as shown in FIG. 5A.

The graph 500 shows a number of status groups, which can include those that have been modified or generated using a clustering algorithm. The status groups shown include a "dependent system acceptable" status group. Two unacceptable groups include a "dependent system unacceptable" status group and a "network overflow" group. The graph 500 shows a two dimensional representation of datapoints on a plane that includes network utilization on the Y axis and CPU utilization on the X axis. However, the datapoints and the graph can include 3 dimensions, 4 dimensions, or any number of dimensions "n," corresponding to the number of parameters considered. The graph 500 includes a boundary 503 including a first boundary value 503a and a second boundary value 503b. The management service 140 can generate the boundary values 503a and 503b so that the datapoints bounded from the origin to the respective boundary do not include any of the datapoints from the unacceptable groups. The boundary values 503a and 503b can be chosen such that all of the datapoints of the unacceptable groups include at least one value that is greater than at least one boundary value.

The boundary values 503a and 503b can be included in a list or set of acceptable values that define a boundary 503. Boundary datapoints, as discussed earlier, can be datapoints that are used to select the maximum number of datapoints to assign to a dependent system 115. In some examples, the boundary or exemplary datapoints can be those within a distance 506 less than the boundary value 503a, as well as those within a distance 509 the boundary value 503b. In other examples, the boundary or exemplary datapoints can be those within a distance 512 of an intersection or corner of the boundary values 503.

Figure 5B:
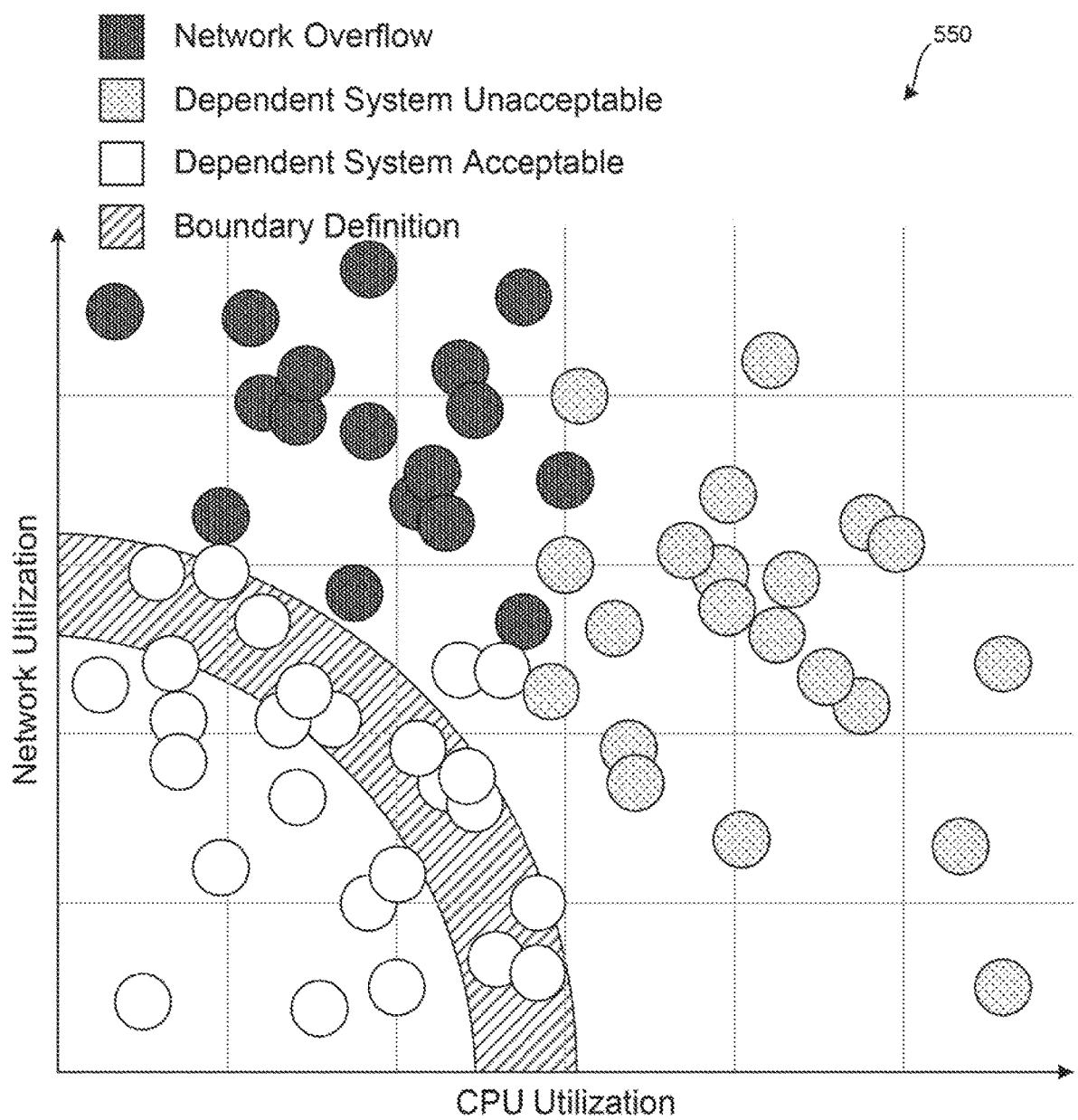

In FIG. 5B, shown is a graph 550 illustrating an example of plotted datapoints for parameters of a dependent system 115. While the graph 550 is illustrative of concepts utilized by the management service 140, a console user interface generated by the management service 140 can include graphs of datapoints for parameters of a dependent system 115, their groupings, and boundary definitions as shown in FIG. 5B. This figure illustrates how the boundary condition can define a range of values such as a two dimensional area. In this scenario, the boundary or exemplary datapoints can be those within the boundary definition.

Stored in the memory device are both data and several components that are executable by the processor. Also stored in the memory can be a datastore 130 and other data. A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. In addition, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

Client devices 108 can be used to access user interfaces generated to configure or otherwise interact with the management service 140. These client devices 108 can include a display upon which a user interface can be rendered. In some examples, the user interface can be generated using user interface data provided by the management system 103. The client device 108 can also include one or more input/output devices that can include, for example, a capacitive touchscreen or other type of touch input device, fingerprint reader, or keyboard.

Although the management service 140 and other various systems described herein can be embodied in software or code executed by general-purpose hardware as discussed above, as an alternative, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show an example of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram flowcharts show a specific order of execution, it is understood that the order of execution can differ from that which is depicted. For example, the order of execution of two or more blocks can be scrambled relative to the order shown. In addition, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including program code, instructions, and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

What is claimed is:

1. A system for optimizing serverless frameworks, the system comprising:
   at least one computing device comprising at least one processor;
   a memory comprising executable instructions, wherein the instructions, when executed by the at least one processor, cause the at least one computing device to at least:
   allocate a dependent system to an enterprise, the dependent system providing a resource utilized by a function associated with the enterprise;
   monitor datapoints from a load test that executes instances of the function on the dependent system, wherein the datapoints specify system parameters of the dependent system, the system parameters comprising: a network utilization, a CPU utilization, and a memory utilization;
   organize, based on a clustering algorithm, the datapoints into groups comprising: an acceptable group associated with acceptable operation of the dependent system, and at least one unacceptable group associated with unacceptable operation of the dependent system;
   define a respective boundary value for the system parameters, the respective boundary value being defined to exclude the datapoints of the at least one unacceptable group and include a subset of the datapoints of the acceptable group;
   determine, for the dependent system, a maximum number of concurrent instances of the function based on a number of instances specified by at least one selected datapoint from the acceptable group, wherein the at least one selected datapoint is selected from the acceptable group based on a threshold distance from the respective boundary value; and
   execute a live workload on the dependent system, the live workload comprising instances of the function that are assigned to the dependent system based on the maximum number of concurrent instances.

2. The system of claim 1, wherein a plurality of selected datapoints are selected from the acceptable group based on the threshold distance from the respective boundary value, and the maximum number of concurrent instances of the function is a minimum number of instances specified by the plurality of selected datapoints.

3. The system of claim 1, wherein the instructions, when executed by the at least one processor, cause the at least one computing device to at least:
   receive, from the enterprise, a request to utilize the function, wherein the request comprises an API call associated with the function.

4. The system of claim 1, wherein the instructions, when executed by the at least one processor, cause the at least one computing device to at least:
   determine that a service level agreement associated with the function requires a greater number of instances than the maximum number of concurrent instances;
   allocate an additional dependent system to the enterprise; and
   assign at least one instance of the function to the additional dependent system.

5. The system of claim 1, wherein the instructions, when executed by the at least one processor, cause the at least one computing device to at least:
   determine, for the dependent system, that the maximum number of concurrent instances of the function is reached; and
   assign an additional instance to the dependent system once an instance is completed.

6. A non-transitory computer-readable medium, comprising executable instructions, wherein the instructions, when executed by at least one processor, cause at least one computing device to at least:
   allocate a dependent system to an enterprise, the dependent system providing a resource utilized by a function associated with the enterprise;
   monitor datapoints from a load test that executes instances of the function on the dependent system, wherein the datapoints specify system parameters of the dependent system, the system parameters comprising: a network utilization, a CPU utilization, and a memory utilization;
   organize, based on a clustering algorithm, the datapoints into groups comprising: an acceptable group associated with acceptable operation of the dependent system, and at least one unacceptable group associated with unacceptable operation of the dependent system;
   define a respective boundary value for the system parameters, the respective boundary value being defined to exclude the datapoints of the at least one unacceptable group and include a subset of the datapoints of the acceptable group;
   determine, for the dependent system, a maximum number of concurrent instances of the function based on a number of instances specified by at least one selected datapoint from the acceptable group, wherein the at least one selected datapoint is selected from the acceptable group based on a threshold distance from the respective boundary value; and
   execute a live workload on the dependent system, the live workload comprising instances of the function that are assigned to the dependent system based on the maximum number of concurrent instances.

7. The non-transitory computer-readable medium of claim 6, wherein a plurality of selected datapoints are selected from the acceptable group based on the threshold distance from the respective boundary value, and the maximum number of concurrent instances of the function is a minimum number of instances specified by the plurality of selected datapoints.

8. The non-transitory computer-readable medium of claim 6, wherein the instructions, when executed by the at least one processor, cause the at least one computing device to at least:

receive, from the enterprise, a request to utilize the function, wherein the request comprises an API call associated with the function.

9. The non-transitory computer-readable medium of claim 6, wherein the instructions, when executed by the at least one processor, cause the at least one computing device to at least:
determine that a service level agreement associated with the function requires a greater number of instances than the maximum number of concurrent instances;
allocate an additional dependent system to the enterprise; and
assign at least one instance of the function to the additional dependent system.

10. The non-transitory computer-readable medium of claim 6, wherein the instructions, when executed by the at least one processor, cause the at least one computing device to at least:
determine, for the dependent system, that the maximum number of concurrent instances of the function is reached; and
assign an additional instance to the dependent system once an instance is completed.

11. A computer-implemented method, comprising:
allocating a dependent system to an enterprise, the dependent system providing a resource utilized by a function associated with the enterprise;
monitoring datapoints from a load test that executes instances of the function on the dependent system, wherein the datapoints specify system parameters of the dependent system, the system parameters comprising: a network utilization, a CPU utilization, and a memory utilization;
organizing, based on a clustering algorithm, the datapoints into groups comprising: an acceptable group associated with acceptable operation of the dependent system, and at least one unacceptable group associated with unacceptable operation of the dependent system;
defining a respective boundary value for the system parameters, the respective boundary value being defined to exclude the datapoints of the at least one unacceptable group and include a subset of the datapoints of the acceptable group;
determining, for the dependent system, a maximum number of concurrent instances of the function based on a number of instances specified by at least one selected datapoint from the acceptable group, wherein the at least one selected datapoint is selected from the acceptable group based on a threshold distance from the respective boundary value; and
executing a live workload on the dependent system, the live workload comprising instances of the function that are assigned to the dependent system based on the maximum number of concurrent instances.

12. The computer-implemented method of claim 11, wherein a plurality of selected datapoints are selected from the acceptable group based on the threshold distance from the respective boundary value, and the maximum number of concurrent instances of the function is a minimum number of instances specified by the plurality of selected datapoints.

13. The computer-implemented method of claim 11, further comprising:
receiving, from the enterprise, a request to utilize the function, wherein the request comprises an API call associated with the function.

14. The computer-implemented method of claim 11, further comprising:
determining that a service level agreement associated with the function requires a greater number of instances than the maximum number of concurrent instances;
allocating an additional dependent system to the enterprise; and
assigning at least one instance of the function to the additional dependent system.

* * * * *